United States Patent [19]
Stockwell et al.

[11] Patent Number: 5,746,885
[45] Date of Patent: May 5, 1998

[54] METHOD FOR DEINKING PRINTED PAPER USING AN EMULSION OF CROSSLINKED, INSOLUBLE, IONIZABLE AND SWELLABLE POLYMER PARTICLES

[75] Inventors: John Oliver Stockwell, Liversedge; Timothy Guy Bingham, Heaton Moor; Howard Roger Dungworth, Greetland, all of England

[73] Assignee: Allied Colloids Limited, West Yorkshire, England

[21] Appl. No.: 685,921

[22] Filed: Jul. 22, 1996

Related U.S. Application Data

[63] Continuation-in-part of PCT/GB95/02697, Nov. 16, 1995 published as WO96/16224, May 30, 1996.

[30] Foreign Application Priority Data

Nov. 21, 1994 [GB] United Kingdom ............ 9423454

[51] Int. Cl.$^6$ ................................ D21C 5/02
[52] U.S. Cl. ................................ 162/5
[58] Field of Search ................................ 162/4, 5

[56] References Cited

FOREIGN PATENT DOCUMENTS

| | | | |
|---|---|---|---|
| 0 114 478 | 8/1984 | European Pat. Off. | C08F 220/04 |
| 0 248 612 | 6/1987 | European Pat. Off. | C09D 7/12 |
| 0 373 375 | 11/1989 | European Pat. Off. | D21C 5/02 |

OTHER PUBLICATIONS

International Search Report.

*Primary Examiner*—Donald E. Czaja
*Assistant Examiner*—Dean T. Nguyen
*Attorney, Agent, or Firm*—Sughrue, Mion, Zinn, Macpeak & Seas, PLLC

[57] ABSTRACT

Flexographic or other printed paper is deinked by a process which comprises pulping in the presence of an emulsion of crosslinked, insoluble, ionisable and swellable polymer particles. The emulsion preferably provides a viscosity (at 3%) in the ionised state of below 50,000 cps (Brookfield RVT) and is novel.

14 Claims, No Drawings

METHOD FOR DEINKING PRINTED PAPER USING AN EMULSION OF CROSSLINKED, INSOLUBLE, IONIZABLE AND SWELLABLE POLYMER PARTICLES

This application is a continuation-in-part of the U.S. designation of PCT/GB95/02697 filed 16th Nov. 1995 by the present applicants and their assignee, published as WO96/16224, May 30, 1996.

RELATED APPLICATIONS

The use of the novel polymers described herein for reducing contamination in a cellulosic liquor due to stickies which do not arise from deinking is described in PCT/GB95/02696 filed 16th Nov. 1995, WO96/16224 and U.S. application Ser. No. 08/684,054 by Paul Cutts et al filed even date herewith and commonly assigned.

BACKGROUND OF THE INVENTION

This invention relates to de-inking processes that utilise polymeric materials to promote separation of the ink from pulped cellulosic material, and to novel polymeric materials which are particularly suitable for this use, but which also can be used in other processes.

Conventional de-inking processes comprise forming a pulp of recycled paper and separating a hydrophobic fraction containing ink from the pulp and recovering the resultant de-inked pulp. The separation of the hydrophobic fraction is promoted by including de-inking chemicals in the pulp.

There is a major commercial need to provide processes for deinking paper that are efficient, that do not degrade the paper that is being recycled, that are cost effective, convenient to operate, and environmentally acceptable.

Traditional deinking processes comprise pulping the recycled paper in a highly alkaline environment but this can cause yellowing of the cellulose fibres and the necessity to provide high alkalinity and peroxide is undesirable. Processes operated at lower pH values have been proposed, for instance in WO90/10749 and in WO93/21376.

Various additives for one or more of the processes have been proposed. For instance in GB 2178079 it is proposed to add an accelerator, and included amongst the accelerators that are mentioned are copolymers of (meth) acrylic acid and (meth) acrylic ester having molecular weight 1,000 to 10,000 and with a molar ratio of the acid to ester groups of from 1 to 49. An example in the specification shows that bad results are obtained with a copolymer of 1 mole potassium methacrylate and 2 moles methyl methacrylate molecular weight 40,000, compared to various copolymers having molecular weight below 10,000.

Other polymers which have been proposed for deinking include an emulsion of PVC or polymethyl methacrylate (Tsellyul Bum. Karton 1978, 4, 6 and Chem. Abs. 89:7865) melamine resins (U.S. Pat. No. 5,286,390), resin prepolymers (U.S. Pat. No. 5,073,234 and EP 163444) and polyolefine emulsions (Chem. Abs. 79:147582 and JP-B-47040881).

Another additive which is sometimes proposed for use is bentonite.

The ability to achieve satisfactory deinking often constitutes a restriction on the amount or type of recycled paper that can be utilised for the production of many grades of paper. For instance the use of newsprint which carries water-based flexographic ink can significantly reduce brightness after deinking by known treatments. Accordingly many deinking plants cannot effectively utilise even small amounts of flexo-printed paper. There is an urgent need for improved deinking processes, including deinking of flexo-printed paper.

A first aspect of the invention, as described below, relates to a novel de-inking process that uses an emulsion polymer to promote the separation of the hydrophobic fraction.

It is standard practice to make a polymer emulsion by oil-in-water emulsion polymerisation of a substantially water insoluble monomer blend comprising water insoluble hydrophobic monomer, such as ethyl acrylate, and some hydrophilic monomer that, at the polymerisation pH, is substantially non-ionised and is preferentially soluble in the monomer blend but which is preferentially soluble in water when ionised, at a higher or lower pH. For instance methacrylic acid dissolves in ethyl acrylate when it is present as free acid at acidic polymerisation pH values to allow formation of a copolymer of ethyl acrylate and methacrylic acid, but when the polymer is exposed to alkali (so that the monomer would then have ionised to an alkali soluble salt, and would have preferentially dissolved in the aqueous alkali) the ionisation of the methacrylic acid units in the polymer to the corresponding methacrylic acid soluble salt units causes the polymer to become soluble.

It is well known to produce polymers of this type as viscosifiers, in that the emulsion has low viscosity but even a small amount of the emulsion (for instance 3% dry weight polymer) in aqueous alkali gives a very high viscosity as a result of dissolution of the polymer.

It is also known to include small amounts of cross-linking agents in the initial polymerisation mixture with the intention that the dissolution of the emulsion polymer particles will be restrained or prevented. However the amount of cross-linker that is used is always sufficiently low, in practice, that the emulsion still provides a high viscosity in water after pH adjustment. Typically, satisfactory viscosifying emulsion polymers of this type are such that an aqueous composition, formed by blending 3% (dry weight polymer) of the emulsion in water with acid or alkali to provide the solubilisation of the polymer, has a viscosity above 100,000 cps measured by Brookfield RVT Viscometer. Indeed, a 3% composition is frequently a gel. These soluble or highly swelling polymers are not useful for the deinking process.

A second aspect of the invention, as described below, relates to a novel emulsion polymer which can be used in the deinking process.

SUMMARY OF THE INVENTION

A de-inking process in accordance with the first aspect of the invention comprises forming a pulp of recycled paper, separating a hydrophobic fraction containing ink from the pulp and recovering the de-inked pulp, and in this process the separation of the hydrophobic fraction is promoted by including in the pulp an emulsion in water of polymer formed of a water insoluble monomer blend comprising a) at least 20% by weight hydrophobic monomer having a solubility in water of below 5 g/100 cc at 20° C.

b) at least 10% by weight of a hydrophilic ionisable monomer that is preferentially soluble in the monomer blend when substantially non-ionised but is preferentially soluble in water when ionised c) 0 to 50% by weight of a non-ionisable hydrophilic monomer that is preferentially soluble in the monomer blend and which has a solubility in water of above 5 g/100 cc at 20° C.

d) 0.05 to 10% cross-linking agent and in which the proportions of a, b, c and d are such that an aqueous composition, formed by blending 3% (dry weight polymer) of the emulsion in water with acid or alkali to ionise monomer (b) is a fluid composition which contains the polymer in swollen particulate form.

The preferred polymers are new and form a second aspect of the invention. They are characterised, inter alia, by the fact that they give a lower viscosity when ionised that conventional viscosifying polymer emulsions, as a result of being cross linked sufficient to restrict swelling and dissolution. In particular the proportions of a, b, c and d are such that an aqueous composition, formed by blending 3% (dry weight polymer) of the emulsion in water with acid or alkali to ionise monomer (b), is a fluid composition which contains the polymer in swollen particulate form and has a viscosity at pH 10 (when (b) is anionic) or pH 3 (when (b) is cationic) of below 50,000 cps measured by a Brookfield RVT Viscometer.

DESCRIPTION OF THE PREFERRED EMBODIMENTS

The polymer should substantially retain its particulate form during the de-inking process and the proportions of the monomers should therefore be selected such that this is achieved. In particular, sufficient cross linking agent should be included to ensure that the particulate nature is substantially maintained. If the amount of cross linking agent is too low, the polymer may fully dissolve in use and this is undesirable.

Whether or not the particles do substantially retain their particulate form can be estimated by observing viscosity.

Preferably the polymer emulsion is such that, when blended with water to provide a 3% composition and adjusted to the pH prevailing in the de-inking process, that composition would give a viscosity below 50,000, preferably below 10,000 and most preferably below 2,000 cps measured by a Brookfield RVT Viscometer. Generally the viscosity is between 50 and 1000 cps. However in some processes it is possible to use polymers that would give viscosities above 100,000 cps provided the polymer is added as a composition having a concentration such that it can conveniently be utilised in the process.

The polymer is preferably such that it has a particle size, at the pH prevailing in the de-inking process, of below 15 μm and most preferably below 10 μm, with best results generally being obtained when the particle size is below 5 μm, especially below 3 μm. It is usually above 0.1 μm and preferably above 0.3 μm.

The polymer particles swell as units of monomer (b) ionise. The emulsion is generally made by emulsion polymerisation at a pH at which the units of monomer (b) are substantially non-ionised and in this state the polymer preferably has a particle size below 0.5 μm, most preferably below 0.3 μm. It is usually above 0.02 μm, and generally above 0.05 μm. It is generally preferred that, at the pH prevailing in the de-inking process, the particle size is generally at least about 1.5 times, and often at least 2.5 times the unswollen particle size. Normally it is not more than about 5 or 8 times the unswollen particle size but useful results can still be obtained with higher degrees of swelling, for instance up to 15 or 20 times. All particle sizes defined herein are the particle size (i.e., diameter) as determined by laser light scattering, of 95% by weight of the particles. Thus typically the particles may swell from a size of 50 to 300 nm up to 300 to 1500 nm.

It is necessary to include sufficient cross linking agent to prevent total solubilisation of the particles and in particular to control the particle size in use to the desired size, and to minimise viscosity increase. Generally the amount of cross linking agent is at least 0.1% and usually at least 0.2% (2,000 ppm) by weight. Such polymers are useful especially when the de-inking process is conducted at a substantially neutral pH such that the monomer (b) only becomes partly ionised. For instance de-inking may be conducted at a pH of around 6.5 to 8 using a polymer which has the desired particle size under these conditions but which would swell further if the pH was higher (e.g., pH 10) or lower (e.g., pH 3).

Preferably, however, the polymer is made using proportions of cross linking agent and other monomers such that it does only swell up to 15 or 20 times its unswollen diameter, preferably up to 8 times its unswollen diameter, when it is fully ionised. Such a polymer can then be used in a de-inking process without risk of the polymer dissolving or providing too high a viscosity if the pH of the process is particularly high or particularly low.

The preferred polymers are obtained using higher amounts of cross linking agent, usually at least 0.5% and typically 1 or 2% to 5% by weight. The amount of cross linking agent and proportions of other monomers are selected such that the polymer has the required relatively low swelling rate and the required relatively low viscosity for a 3% composition when exposed to sufficient alkali or acid to achieve maximum potential swelling of the polymer (e.g., pH 3 or pH 10).

The polymer emulsion is preferably made by conventional oil-in-water emulsion polymerisation of the monomer blend at a pH at which monomer (b) is substantially unionised and the resultant polymer is substantially unionised and unswollen, so that the monomer (b) is preferentially soluble in the monomer blend at this pH. However, upon adjusting the pH of the final composition to a pH at which the monomer would have ionised, the polymer swells.

The monomers are usually all ethylenically unsaturated monomers.

By referring to the monomers as being preferentially soluble in the monomer blend we mean that the monomers dissolve in the oil phase of the oil-in-water emulsion polymerisation mixture is preference to the water phase sufficient that there is substantially no polymerisation of monomer in the water phase.

The oil-in-water emulsion polymerisation is conducted at the polymerisation pH, which is the pH which the hydrophilic ionisable monomer is non-ionised and is preferentially soluble in the monomer blend and typically this is in the range 2 to 11.

When the monomer (b) is anionic (generally a carboxylic monomer) the polymerisation pH should normally be acidic, typically around 2 to 5 or 6, and the resultant polymer will swell when the pH is subsequently adjusted to being alkaline, typically above 7, for instance 7.5 or 8 to 10.

When monomer (b) is cationic (generally an amine monomer) the polymerisation pH is generally alkaline typically 8 to 10 often around 9, and the polymer can then be put into its fully swollen state in an acidic medium, typically pH 4 to 6.

The amount of hydrophobic monomer (a) is generally 20 to 80%. Normally it is above 40%. Generally it is below 70% and often below 60%. An amount of around 50% is often preferred.

The amount of the hydrophilic ionisable monomer (b) is generally 10 to 80% by weight. The amount typically is at least 20% and is usually at least 30% and often at least 40%. If too much is included it may be difficult to select a monomer (a) that will prevent the monomer (b) dissolving into the aqueous phase and so generally the amount of monomer b is below 60%. Amounts of around 50% are often preferred.

Monomer (c) is optional but can be included, if desired, to improve hydrophilic properties without increasing pH sensitivity. Generally the amount is below 30%, usually below 10% and usually the monomer is omitted.

The amount of cross-linker is generally above 0.1%. The amount depends upon the relative proportions of the monomers (a), (b) and (c). Increasing the amount of (b) tends to increase the amount of cross-linker (d) that is required, in order to resist excess swelling. Conversely, increasing the amount of monomer (a) tends to reduce the amount of cross-linker (d) that is required. The amount is preferably sufficiently high that substantially no polymer can be dissolved from the polymer particles. Thus preferably the soluble fraction is below 1% measured by gel content.

The hydrophobic monomer (a) must have solubility in water of below 5 g/100 cc at 20° C. and this solubility is normally substantially independent of the polymerisation pH and so the hydrophobic monomer will generally have this low solubility value throughout, for instance, the pH range 2 to 10. Preferably the solubility of the hydrophobic monomer in water is even lower, for instance below 1.5 g/100 cc.

The solubility of any non-ionisable hydrophilic monomer (c) is generally any value greater than the maximum defined solubility for the hydrophobic monomer and typically is above 10 g/100 cc at 20° C. but usually is not more than 200 g/100 cc at 20° C. These solubilities will normally be substantially independent of pH.

The polymerisation is an addition polymerisation involving ethylenically unsaturated monomers. It is generally conducted so that the molecular weight, in the absence of cross-linking agent, would be in the range 100,000 to 500,000 measured by gel permeation chromatography.

The hydrophobic monomer (a) can be any of the monomers conventionally utilised for copolymerisation with ethylenically unsaturated carboxylic monomers in oil-in-water emulsion polymerisation. Thus they may be selected from alkyl (meth) acrylates, styrenes, vinyl esters, acrylonitriles, associative monomers (for instance acrylic esters or allyl ethers having a pendant polyethoxy chain terminated with a hydrophobic group such as fatty alkyl or alkaryl or aralkyl) or vinyl ethers. The preferred monomer (a) is selected from styrene and alkyl (meth) acrylate wherein the alkyl groups are generally C1 to 8 but can be fatty alkyl. The preferred monomer (a) is ethyl acrylate but other suitable monomers include styrene, methyl acrylate, butyl acrylate. Blends of monomer (a) can be used.

The ionisable monomer (b) is usually an ethylenically unsaturated carboxylic acid or amine. Suitable carboxylic acids are methacrylic acid, acrylic acid, itaconic acid, crotonic acid, maleic acid (or anhydride). The, preferred acid is methacrylic acid. Suitable ionisable amines are monoalkyl and dialkyl aminoalkyl (meth) acrylates and dialkyl aminoalkyl (meth) acrylamides. Typical materials are dimethyl aminoethyl (meth) acrylates.

Non-ionisable hydrophilic monomer (c) can be, for instance, a hydroxy alkyl (meth) acrylate, typically hydroxyethyl (meth) acrylate.

The cross-linker (d) can be any oil-soluble polyethylenically unsaturated cross-linker or other cross-linker suitable for causing cross-linking during oil-in-water emulsion polymerisation. Typical materials are divinylbenzene, diallyl phthalate, and di, tri, and tetrafunctional (meth) acrylates. The preferred material is diallyl phthalate (DAP).

The oil-in-water emulsion polymerisation is preferably conducted in such a way that the polymer particles formed by the emulsion polymerisation have a dry size (as determined by laser light scattering) below 0.5 μm and generally below 0.3 μm and preferably above 0.02 μm, typically 0.05 to 0.2 μm. Thus at least 90% by weight, often at least 95% and preferably at least 100% by weight of the particles have such a size.

The emulsion polymers may be made by broadly conventional oil-in-water emulsion polymerisation techniques suitable for making the desired particle size. Thus typically a monomer blend is formed and is emulsified into water at the polymerisation pH in the presence of a suitable emulsifier. The emulsifier typically is of the anionic class, preferably a fatty alcohol ethoxylate sulfate. The amount of emulsifier typically is around 3%. Emulsification may be achieved by homogenising the monomer blend in the water containing the emulsifier in conventional manner.

Polymerisation may be initiated by including typically water soluble initiators such as ammonium persulphate.

The polymerisation is preferably conducted at a temperature of at least 70° C. but usually below 90° C. The polymerisation normally continues for a period of 1 to 3 hours. If desired, monomer may be fed into the polymerisation mixture during polymerisation.

The total amount of polymer in the final polymer emulsion is generally in the range 20 to 40% by weight. When all the monomer is in the emulsion before polymerisation, the amount will therefore preferably be within the same range.

When using the emulsion in a de-inking process, the emulsion can be added to a preformed pulp of recycled paper, but is preferably included in the pulper during or before the initial pulping of the recycled paper to form the pulp or is added after pulping and before flotation. The pulping can be conducted to give a cellulosic content of the pulp of any convenient value, typically between 2 and 15 or 20%. Thus the invention is applicable to low-solids pulping processes typically having a cellulosic concentration of around 4% or to high solids pulping processes typically having a cellulosic concentration of around 12 to 15%. Instead of adding the emulsion into the pulper, a pulp having a solids content of, typically 3 to 15% may be diluted to, typically 0.2 to 2.5% ready for flotation, and the emulsion can be added to the diluted pulp before flotation.

The amount of emulsion that is added will depend upon the nature of the pulp and the level of ink contamination in it but is generally in the range 0.01 to 2% (dry weight polymer) based on the weight of fibre. Best results generally require that the amount should be at least around 0.05% dry weight polymer based on fibre but it is usually unnecessary to use more than around 0.5 or 1% dry weight polymer based on the fibre. Expressed in terms of the weight of the emulsion, typical amounts are generally in the range 0.1 to 2% by weight based on the weight of the fibre.

The invention can be used almost irrespective of the pH of the pulp. Thus the invention can be operated under acidic pulping conditions, in which event the ionisable monomer is preferably an amine, but it can be a carboxylic monomer. Alternatively the pulping can be under substantially neutral conditions such that there is substantially no ionisation of the ionisable monomer groups and the polymer is substantially unswollen. Preferably, however, the ionisable monomer is preferably a carboxylic monomer and the pulping is conducted at a pH such that it is partially or fully ionised. For instance the pulping can be conducted at pH 7.5 to 8.5. The process can, however, also be conducted under conventional higher alkaline conditions such as pH 9 to 11.5.

Thus an advantage of the invention is that it is applicable over the entire range of pH pulping conditions from, say, pH 4 to pH 12. In particular, the invention can be performed very satisfactorily with substantially neutral deinking conditions such as pH 6.5 to 8.5.

Although it is preferred that the emulsion polymer is substantially the only deinking chemical that is included in the pulper or added subsequently (except for pH adjusters), it is possible to use it in combination with other deinking chemicals such as any of those discussed above. For instance the invention can be conducted in the presence of highly alkaline deinking processes such as those conducted with sodium hydroxide and/or sodium silicate, and optionally with hydrogen peroxide or in substantially neutral processes in which the main deinking component is dissolved sodium polyacrylate as described in WO93/21376. It may be conducted in combination with cationic surfactant as described in WO95/12026. When sodium polyacrylate or other water soluble polycarboxylate is used, it may have molecular weight in the range 2,000 to 20,000 or it can be much higher, for instance up to 150,000.

The polymer and the ink is subsequently separated from the pulp, often after dilution of the pulp. The separation is preferably by flotation and/or washing and filtration.

An advantage of the invention is that stickies released during the deinking pulping or other process are also collected, with the ink, by the polymer particles. Thus the process can combine deinking with the removal of stickies, and so the collected hydrophobic fraction can contain ink and stickies and the polymer particles.

In a preferred process the pulp which has been treated with the polymer emulsion is subjected to flotation under conditions whereby the ink and the polymer floats to form the reject fraction. The accept fraction which is recovered from this, or the starting pulp, may be subjected to pressure or other filtration whereby the ink and the polymer is removed in the filtrate. The flotation process tends to remove the coarser particles (for instance 10 to 100 µm, while the washing tends to remove the finer particles and the preferred process of the invention uses both flotation and washing.

If desired, the deinked pulp can be subjected to a conventional bleaching treatment either during the deinking process or subsequently. However an advantage of the invention is that it is possible to perform the deinking under conditions such that bleaching is unnecessary and so can be avoided. The deinked pulp can be recovered and used for paper making in the conventional manner.

The deinking process of the invention can be applied to the deinking of any conventional papers printed with any conventional inks. However a particular advantage of the invention is that it is effective when the paper that is being deinked includes paper which has been printed with water-based flexographic ink. The polymer has hydrophobic moieties and hydrophilic moieties and so is amphipathic. It interacts with the ink (even though flexographic ink can often be regarded as hydrophilic) to provide a fraction which is hydrophobic relative to the aqueous liquor and which can therefore be separated from it.

It is well accepted in the deinking industry at present that known deinking processes tend to give poor brightness if there is any significant content of water-based flexographic ink printing in the paper that is being deinked. Accordingly, some paper that would otherwise be recycled cannot be used and it is generally desirable deliberately to exclude significant amounts of such paper from paper that is to be deinked. However it often happens that some paper carrying water-based flexographic ink is included in the blend which is to be deinked, and this can traditionally result in poor brightness if the amount which is present becomes significant. Typically therefore the amount of paper which is included in the deinking process and which carries water-based flexographic ink is kept as low as possible, usually below 8% and preferably below 5% by weight of the total paper which is being deinked, and preferably it is as near zero as possible. However the process of the invention allows for good deinking even though the paper which is being deinked includes a significant amount of paper carrying water-based flexographic ink.

Thus the paper can be a blend containing at least 5% by weight of paper which carries water-based flexographic printed ink. Generally the amount is at least 10% and frequently at least 20% by weight of the blend. The process can be applied to the deinking of such paper alone, but for best results it is generally applied to the deinking of blends containing not more than 50%, and often not more than 30%, by weight of paper carrying water-based flexographic ink. Despite the presence of these large amounts, the brightness of the resultant deinked pulp can be satisfactory and, indeed, can be better than the brightness of the pulp obtained using traditional processes with much smaller amounts of paper carrying water-based flexographic ink.

Another traditional problem of pulping processes using paper carrying such ink is that there can be inky waste water clarification problems. The deinking process of the invention reduces these. Accordingly, the invention provides, for the first time, the ability to deink waste paper containing at least 10% paper carrying water-based flexographic ink so as to obtain good brightness and so as to produce a waste water which can be satisfactorily clarified by conventional clarification procedures.

Paper blends including water-based flexographic printed paper can be deinked in the invention by adding the emulsion into the pulper, often as the only pulping aid but optionally with soap or other pulping agents. Thus the deinking can be conducted in the absence of bleach to give adequate brightness results.

Best results are generally obtained with these paper blends (or indeed with any papers that are deinked in the invention) by pulping as a relatively concentrated pulp (for instance 5–15% solids) often around 10%, followed by dilution to around 0.5 to 2.5% solids (often around 1.2%) in a dilute stock chest or other suitable apparatus followed by flotation in a Voith or other flotation cell (preferably with re-circulation through the cell), followed by washing. Typically washing is by a Side Hill Screen or other suitable apparatus with the liquor going to a Krofta or other DAF clarifier and the solids going to a belt thickener. In such processes the emulsion is preferably added at the dilute stock chest stage and pulping can be conducted using conventional pulping chemistry, such as an alkaline system including peroxide as a bleach.

This use of alkaline bleach pulping or other pulping or other pulping followed by dilution and the addition of the emulsion and then flotation tends to give better brightness than addition of the emulsion directed to the pulper, without any bleach. However the latter process is acceptable when it is desirable to avoid the use of bleaching and high alkali systems.

The presence of the emulsion seems to promote greatly the flotation effect, as well as giving better brightness and clarification. It is possible that part of the improvement is due to the presence of the emulsifier which is introduced in the emulsion, but the presence of the ionised, swollen, insoluble, ampipathic polymer particles is clearly essential to the deinking effect.

In addition to permitting good deinking of paper carrying water-based flexographic ink the invention has several other advantages. One advantage of the invention is that it is possible to obtain very effective deinking without the use of additional deinking chemicals and at substantially neutral pH. Another advantage of the invention is that is possible for a mill to continue using their existing deinking technology but to add the use of the emulsion to the existing process so as to obtain improved results.

Another advantage of the invention is that the improved results that are attainable allow the use of larger amounts of recycled paper while maintaining constant, or even improved, brightness in the final paper.

Another advantage of the invention is that the improved results that are attainable allow the use of a higher percentage of mechanical fibre in a mixture of mechanical and non-mechanical fibre for de-inking, for instance instead of using a 70:30 ratio of newsprint to magazine in a de-inking waste furnish to produce pulp for newsprint this ratio may be increased to say 80:20 or even 90:10. This would yield cost savings.

The following are examples of the invention.

EXAMPLE 1

This demonstrates the production of the polymer emulsion.

A monomer feed is formed from 155 parts by weight ethyl acrylate, 155 parts by weight methacrylic acid and 5.9 parts by weight (about 2%) diallyl phthalate. This monomer feed is homogenised with 310 parts by weight water, 5.7 parts by weight of a 27% solution of the sodium salt of a sulphated ethoxylated $C_{12-14}$ fatty alcohol surfactant and 0.1 parts by weight sequestering agent. The resultant emulsion together with a solution of 30 parts water and 0.55 parts ammonium persulphate are fed gradually to a solution of 360 parts water 5.75 parts of the surfactant, 0.1 part sequestering agent and 0.38 parts ammonium persulphate over a period of about 90 minutes while maintaining the polymerisation mixture at about 85° C. The polymerisation mixture is maintained at that temperature for about an hour and then cooled.

The product emulsion has a polymer content of about 30% by weight. If necessary, it may be filtered to remove coarse particles. The emulsion as made has a particle size range (determined by laser light scattering) of 95% by weight of the particles about 100 nm (0.1 µm).

When the emulsion is diluted with water to a 3% solids content at pH 8 the particle size is at least 95% about 0.3 µm and the viscosity is about 150 cps measured by a Brookfield RVT Viscometer.

When the process is repeated with different amounts of cross linker, the unneutralised emulsion particle size remains constant (with a mean of around 0.1 µm) but the neutralised, swollen, particle size varies according to the amount of cross linker, as shown in the following table which gives approximate mean particle sizes at different amounts of cross linker after neutralising to above pH 8:

TABLE 1

| Cross linker % | 0.25 | 0.5 | 0.75 | 1 | 2 | 3 |
|---|---|---|---|---|---|---|
| Swollen size (µm) | 1.3 | 1 | 0.6 | 0.65 | 0.3 | 0.36 |

The polymers shown in Example 1 having high degrees of swelling in alkali (generally made with cross linker amounts of 0.25% and below, are commercially available as thickeners. The polymers having higher amounts of cross linking are novel materials. Because of their low swelling properties, they are not useful as thickeners.

EXAMPLE 2

Recycled waste formed mainly of mechanical fibres and containing a large amount of newsprint was pulped in a laboratory disintegrator with the chosen deinking components to give 4.5% cellulosic content in the pulp. This was diluted to 1% and a 100 gsm handsheet was formed from part of the diluted stock.

The remainder of the stock was subjected to flotation in a Voith laboratory flotation cell for 10 minutes and a 100 gsm handsheet was formed from part of the resultant stock.

A thickening stage was then undertaken on the remainder of the stock, with it being passed over a 710 µm sieve to produce a 10% consistency stock. This was rediluted to 1% consistency and a 100 gsm handsheet was formed.

The handsheets were dried at 110° C. on rings and plates and their brightness was measured on the Technibrite Micro TB1C. In a variation of the process, this was repeated except as a high consistency pulp at 11.1% cellulose in the original pulping stage.

The products that were used were as follows were Products A and B. Product A is low molecular weight sodium polyacrylate-sodium carbonate 50:50 mixture (50% active) and product B is the emulsion made from Example 1 (25% active). The results are given in the following table. It is apparent that the use of the emulsion of the invention gave a very significant improvement in deinking compared to product A (which does itself give good deinking), and that this improvement was particularly noticeable in the high consistency pulping process.

TABLE 2

| | Brightness I.S.O. | | | |
|---|---|---|---|---|
| Chemical Treatments | Sample 1 | Sample 2 | Sample 3 | Lift (3–1) |
| 0.4% A | 38.58 | 42.52 | 43.79 | 5.21 |
| 0.25% B | 39.33 | 46.56 | 46.10 | 6.77 |
| 0.5% B | 38.92 | 47.10 | 48.62 | 9.70 |
| 1.0% B | 38.95 | 46.14 | 46.72 | 7.77 |
| High Consistency Pulping 0.5% B | 36.00 | 45.28 | 46.98 | 10.98 |

EXAMPLE 3

A pulp was formed from various proportions of newsprint and magazine paper and subjected to pulping in the presence of a deinking system consisting of hydrogen peroxide, sodium silicate, sodium hydroxide and soap, and after dilution the pulp was then subjected to flotation, and then washing and then post-bleaching using hydrosulphite.

Handsheets were made after pulping (sheet 1), after flotation (sheet 2) after washing (sheet 3) and after post-bleaching (sheet 4).

In process C, the above deinking and bleaching process was conducted as described. In process D 0.5% (based on fibre weight) of the emulsion from Example 1 (2% cross linker) was added after the pulper, but prior to the flotation cell. In process E the soap was omitted but the emulsion from Example 1 was retained.

The results are shown in Table 3. These results again demonstrate the superiority of the process of the invention (D) compared to a conventional deinking process C. They also show that it is possible to eliminate the soap from the conventional process and still obtain results that are adequate or good.

They also show that an increase in newsprint to magazine ratio can be used using this new process while still maintaining or improving pulp quality as measured by brightness thus giving cost savings. The results also demonstrate that the soap may be removed from the traditional formulation affording further benefits.

TABLE 3

| Ratio Newsprint:Magazine | Process | 1 | 2 | 3 | 4 | Brightness Lift (4–1) |
|---|---|---|---|---|---|---|
| 70:30 | C | 45.53 | 48.86 | 50.10 | 51.36 | 5.83 |
| 70:30 | D | 46.15 | 51.79 | 53.93 | 56.03 | 9.88 |
| 70:30 | E | 46.03 | 49.17 | 50.07 | 51.19 | 5.16 |
| 80:20 | C | 46.90 | 50.25 | 49.56 | 52.00 | 5.10 |
| 80:20 | D | 45.76 | 51.87 | 53.23 | 57.02 | 11.26 |
| 80:20 | E | 44.08 | 49.25 | 49.50 | 52.76 | 8.68 |
| 90:10 | D | 44.66 | 49.36 | 50.46 | 54.13 | 9.47 |
| 90:10 | E | 43.42 | 48.42 | 49.06 | 52.99 | 9.67 |

EXAMPLE 4

Pulps were formed from newsprint (70%) and magazine (30%) and subjected to pulping, in the presence of emulsions from the invention (0.5% weight on fibre) with differing amounts of DAP cross linking agent in laboratory disintegrators at a 4.5% consistency. This was diluted to 1% and a 100 gsm handsheet was formed from part of the diluted stock.

The remainder of each stock was subjected to flotation in a Voith laboratory flotation cell for 10 minutes and a 100 gsm handsheet was formed from part of the resultant stock.

A thickening stage was then undertaken on the remainder of the stock, with it being passed over a 710 μm sieve to produce a 10% consistency stock. This was rediluted to 1% consistency and a 100 gsm handsheet was formed.

The handsheets were dried at 110° C. on rings and plates and their brightness was measured on the Technibrite Micro TBIC. Particle size was measured on a Malvern PCS 4700.

TABLE 4

| | Particle | Brightness I.S.O. | | | |
|---|---|---|---|---|---|
| % DAP | Size (μm) at pH 8 | 1 | 2 | 3 | Lift (3–1) |
| 0 | 16.5 | 45.40 | 50.54 | 51.82 | 6.42 |
| 0.1 | 6.8 | 45.45 | 52.53 | 53.37 | 7.92 |
| 0.25 | 1.3 | 44.95 | 52.24 | 54.19 | 9.24 |
| 0.5 | 1 | 44.12 | 53.19 | 55.01 | 10.89 |
| 0.75 | 0.6 | 45.29 | 53.64 | 55.37 | 10.08 |
| 1.0 | 0.65 | 43.26 | 52.04 | 53.36 | 10.10 |
| 2.0 | 0.3 | 42.62 | 50.71 | 51.30 | 8.68 |
| 5.0 | 0.36 | 42.54 | 51.14 | 51.56 | 9.02 |

The results from Table 4 demonstrate that particle size is important for the mechanism of the invention to work, as the brightness peaks at between 0.5 and 1% of DAP for this pulp with the other factors remaining constant, i.e., same chemical copolymers (EA:MAA) in the same ratio (50:50), at the same pH, undergoing the same experiment.

EXAMPLE 5

Pulps (of 4.5% cellulose concentration) were formed using newsprint (80 or 90%) and magazines (20 or 10%) and were tested using the procedure from Example 4 and the differing amounts of cross linking agent shown in Table 5. All polymers were as described in Example 1 and dosed at 0.5% (weight on fibre) into the pulper.

TABLE 5

| Newsprint (%) | Magazine (%) | DAP % | Particle Size (μm/at pH 8) | Brightness I.S.O. | | | Brightness Lift 3–1 |
|---|---|---|---|---|---|---|---|
| | | | | 1 | 2 | 3 | |
| 80 | 20 | .5 | 1.0 | 41.26 | 51.09 | 51.35 | 10.09 |
| 80 | 20 | .75 | 0.6 | 42.49 | 51.19 | 52.23 | 9.74 |
| 80 | 20 | 2 | 0.3 | 43.46 | 49.66 | 49.64 | 6.18 |
| 90 | 10 | .50 | 1.0 | 41.41 | 51.15 | 50.15 | 8.74 |
| 90 | 10 | .75 | 0.6 | 39.93 | 50.28 | 50.64 | 10.71 |
| 90 | 10 | 2 | 0.3 | 43.26 | 48.01 | 47.97 | 4.71 |

It can be seen that the brightness lift using the polymer with swollen particle sizes of 1 and 0.6 μm give greater brightness lifts than the standard chemicals on 70:30 newsprint:magazine (Table 3, line 1) even when increasing the newsprint content to 80 to 90%.

EXAMPLE 6

A deinking process is conducted by forming a high consistency pulp (having a nominal 10% solids content) by pulping the waste paper in a Black Clawson Helico pulper, followed by diluting the high consistency pulp to a nominal 1.2% solids content at the stock chest, followed by passing the diluted pulp to a Voith flotation cell with recirculation around the cell, by which a hydrophobic reject fraction containing the ink was separated leaving a deinked accept fraction.

Subsequent treatments were conventional including, for instance, recovering the liquor and solids and the reject fraction and washing the accept fraction and determining brightness in conventional manner, (where the higher values indicate higher brightness).

In all process the paper blend which was pulped consisted of 70% newsprint and 30% magazine paper. In some of the processes none of the paper had been printed with water-based flexographic ink but in some of the processes sufficient of the newsprint component was replaced with water-based flexographic printed newsprint for the blend to contain 20% of such newsprint.

In one series of processes the pulping was conducted in the presence of a conventional alkaline bleaching deinking composition containing sodium hydroxide, sodium silicate and hydrogen peroxide. When the amount of water-based flexographic printed news ink was zero, the brightness value was 52. However when the amount was 20%, the brightness was 48.

The process using 20% of flexographic newsprint was also conducted with the addition of polymer emulsion similar to the emulsion of example 1 being added to the dilute stock chest at an amount of about 0.3% dry weight polymer based on this solids of the suspension. This gave a brightness value of 53. This clearly demonstrates the excellent deinking that can be achieved in the invention despite the presence of a substantial amount of water-based flexographic printed newsprint in the pulp. It was found that when the process was initially conducted for a period without the emulsion, when the emulsion was added to the dilute stock chest, there was a very rapid change in the appearance of the flotation process and a gradual increase in the brightness of the accept fraction obtained from the flotation process, this presumably being associated with the recycling around the cell.

In another process, the high consistency pulp was formed without the addition of the conventional caustic hydrogen peroxide pulping system and instead the same emulsion was added to the pulper in an amount of 0.5% dry weight polymer. The resultant brightness was 47. This indicates that the brightness obtained using the caustic peroxide pulping system (without subsequent emulsion addition) is about the same as the brightness obtained using the emulsion in the pulper, when there is 20% water-based flexographic printed newsprint in the blend. However it is surprising that similar results can be obtained since the omission of the caustic peroxide pulping system would be expected to enhance considerably the brightness, despite the acknowledged potential disadvantages of the use of such systems. This example shows, however, that the emulsion can give similar results in the absence of the caustic peroxide system.

In these processes, the liquor which went to the clarifier was treated with 25 ppm bentonite and 1 ppm low molecular weight polymer of diallyl dimethyl ammonium chloride. It was found that the solids content at the inlet to the clarifier was higher, and at the outlet was lower when using 20% of the flexographic paper together the emulsion in the dilute stock chest than when the flexographic paper was omitted and the emulsion was not used. Further, it was found that the turbidity in the processes using 20% of the flexographic printed paper were about the same when the soap was used in the pulper with or without the emulsion in the dilute stock chest, but when the emulsion was used as the only additive in the pulper then the turbidity was significantly reduced.

We claim:

1. A deinking process which comprises forming a pulp of recycled paper, separating a hydrophobic fraction containing ink from the pulp and recovering the deinked pulp, and in which the separation of the hydrophobic fraction is promoted by including in the pulp an emulsion in water of polymer formed of a water insoluble monomer blend comprising
    a) at least 20% by weight hydrophobic monomer having a solubility in water of below 5 g/100 cc
    b) at least 10% by weight of a hydrophilic ionizable monomer that is more soluble in the monomer blend than in water when the monomer is substantially non-ionized but is more soluble in water than the monomer blend when the monomer is ionized
    c) 0 to 50% by weight of a non-ionizable hydrophilic monomer that is more soluble in the monomer blend than in water and which has a solubility in water of above 5 g/100 cc, and
    d) 0.05 to 10% cross-linking agent and in which the proportions of a, b, c, and d are such that an aqueous composition, formed by blending 3% (dry weight polymer) of the emulsion in water with acid or alkali to ionize monomer (b) is a fluid composition which contains the polymer in swollen particulate form.

2. A process according to claim 1 in which the proportions of monomers a, b, c and d in the monomer blend are such that an aqueous composition, formed by blending 3% (dry weight polymer) of the emulsion in water with acid or alkali to ionize monomer (b), is a fluid composition which contains the polymer in swollen particulate form and has a viscosity at pH 10 (when (b) is anionic) or pH 3 (when (b) is cationic) of below 50,000 cps measured by a Brookfield RVT Viscometer.

3. A process according to claim 1 in which the emulsion has an unionized particle size below 0.5 µm and a particle size at the pH prevailing in the pulp which is at least 1.5 times the unswollen particle size and is 0.3 to 5 µm.

4. A process according to claim 3 in which the polymer emulsion gives a viscosity, at the pH prevailing in the pulp, of below 10,000 cps measured by a Brookfield RVT viscometer.

5. A process according to claim 1 in which the amount of cross linking agent is at least 0.5% by weight.

6. A process according to claim 1 in which the monomers are ethylenically unsaturated monomers.

7. A process according to claim 1 in which the amount of monomer (a) is 40 to 70%, the amount of monomer (b) is 30 to 60%, and the amount of monomer (c) is 0 to 30% and each of monomers (a), (b) and (c) are ethylenically unsaturated.

8. A process according to claim 1 in which monomer (a) is selected from alkyl (meth) acrylates, styrenes, vinyl esters, acrylonitriles, acrylic esters or allyl ethers having a pendant polyethoxy chain terminated with a hydrophobic group and vinyl ethers, monomer (b) is selected from ethylenically unsaturated carboxylic acids and amines, monomer (c) is a hydroxyalkyl(meth)acrylate and monomer (d) is an oil-soluble polyethylenically unsaturated monomer.

9. A process according to claim 1 in which the emulsion is included in the pulp at a pH of 6 to 8.5.

10. A process according to claim 1 in which the emulsion is substantially the only deinking chemical that is included in the pulp to promote separation of the hydrophobic fraction.

11. A process according to claim 1 in which the separation of the hydrophobic fraction is conducted by a process comprising flotation.

12. A process according to claim 1 in which the recycled paper includes at least 10% by weight paper printed with water-based flexographic ink.

13. A process according to claim 1 conducted by pulping the paper, diluting the pulp and mixing the emulsion into the diluted pulp, and then subjecting the diluted pulp to flotation.

14. A process according to claim 13, in which the emulsion has an unionized particle size below 0.5 µm and a particle size at the pH prevailing in the pulp which is at least 1.5 times the unswollen particle size and is 0.3 to 5 µm, the polymer emulsion gives a viscosity, at the pH prevailing in the pulp, of below 10,000 cps measured by a Brookfield RVT viscometer, monomer (a) is selected from alkyl (meth) acrylates, styrenes, vinyl esters, acrylonitriles, acrylic esters or allyl ethers having a pendant polyethoxy chain terminated with a hydrophobic group and vinyl ethers, monomer (b) is selected from ethylenically unsaturated carboxylic acids and amines, monomer (c) is a hydroxyalkyl(meth)acrylate and monomer (d) is an oil-soluble polyethylenically unsaturated monomer and the amount of monomer (a) is 40 to 70%, the amount of monomer (b) is 30 to 60%, and the amount of monomer (c) is 0 to 30% and each of monomers (a), (b) and (c) are ethylenically unsaturated.

* * * * *